US007949956B2

(12) United States Patent
Imai et al.

(10) Patent No.: US 7,949,956 B2
(45) Date of Patent: May 24, 2011

(54) USER INTERFACING DISPLAY APPARATUS AND IMAGE FORMING APPARATUS

(75) Inventors: Takashi Imai, Nara (JP); Yuji Okamoto, Soraku-gun (JP); Kaoru Ishikura, Kyoto (JP); Shuhji Fujii, Soraku-gun (JP); Nobuyuki Ueda, Yamatokoriyama (JP); Kenji Takahashi, Yamatokoriyama (JP)

(73) Assignee: Sharp Kabushiki Kaisha, Osaka (JP)

(*) Notice: Subject to any disclaimer, the term of this patent is extended or adjusted under 35 U.S.C. 154(b) by 1936 days.

(21) Appl. No.: 10/603,721

(22) Filed: Jun. 24, 2003

(65) Prior Publication Data

US 2004/0012635 A1 Jan. 22, 2004

(30) Foreign Application Priority Data

Jul. 18, 2002 (JP) ................................ 2002-209788

(51) Int. Cl.
*G06F 3/048* (2006.01)

(52) U.S. Cl. ......................... 715/809; 715/808; 715/810

(58) Field of Classification Search .................. 345/809; 715/809, 808, 810
See application file for complete search history.

(56) References Cited

U.S. PATENT DOCUMENTS 4,502,776 A * 3/1985 Matsumoto et al. .......... 399/403
4,922,295 A * 5/1990 Takano et al. .................. 399/81
5,267,327 A * 11/1993 Hirayama ..................... 382/161
5,845,078 A * 12/1998 Tezuka et al. ................. 709/222
5,978,619 A * 11/1999 Kato et al. ...................... 399/80
6,038,040 A * 3/2000 Nishimura et al. ........... 358/468
6,179,547 B1 * 1/2001 Hayakawa ................. 414/788.4
6,385,412 B1 * 5/2002 Sadakuni ........................ 399/75
6,585,436 B2 * 7/2003 Kurashina .................. 400/615.2
6,636,720 B2 * 10/2003 Fujii et al. ..................... 399/382
6,745,334 B1 * 6/2004 Ikegami .......................... 726/19
2002/0041390 A1 * 4/2002 Mizuno et al. ............... 358/1.15
2002/0048035 A1 * 4/2002 Beaudet et al. .............. 358/1.14
2002/0050996 A1 * 5/2002 Hirayama ..................... 345/473

FOREIGN PATENT DOCUMENTS

JP 0317506 * 12/1989 .................... 235/432
JP 03175065 * 7/1991 .................... 235/432
JP 2887800 2/1999
JP 2002-041202 2/2002

* cited by examiner

*Primary Examiner* — Weilun Lo
*Assistant Examiner* — Shashi K Becker
(74) *Attorney, Agent, or Firm* — Edwards Angell Palmer & Dodge LLP; David G. Conlin; David A. Tucker

(57) ABSTRACT

Provided are a user interfacing display apparatus having improved operability without confusing the user as to setting displayed on a pop-up screen, and an image forming apparatus. When a copy ratio key as a detail setting key is selected on an LCD as a display section provided in the user interfacing display apparatus mounted on an image forming apparatus, the pop-up screen is displayed. At the same time, a display state of an interruption key is changed, so as to be displayed to inform that the interruption key is unavailable. While the pop-up screen is being displayed, a user is not allowed to select the interruption key. Thus, for example, on contrary to a case where process is switched to an interruption mode while the pop-up screen is being displayed, there will be no confusion as to the detail setting displayed on the pop-up screen before switching to the interruption mode.

17 Claims, 10 Drawing Sheets

USER INTERFACING DISPLAY APPARATUS AND IMAGE FORMING APPARATUS

FIELD OF THE INVENTION

The present invention relates to a user interfacing display apparatus for use in an electronic apparatus capable of performing a plurality of jobs. More particularly, the present invention relates to a user interfacing display apparatus (i) provided with an interruption key for detecting (receiving), for example, an interruption instruction, and for displaying information as to a job and (ii) displaying, in a pop-up manner, detail items of detail setting of the job.

BACKGROUND OF THE INVENTION

Recently, a number of functions available for users has been increased in various electronic apparatus as technologies advanced. Thus, in an image forming apparatus such as a photocopying machine, a user-interfacing display apparatus such as a liquid crystal panel is used for displaying those functions in a user-friendly manner. More specifically, for example, options of detail setting are displayed first. Then, as a pop-up screen, detail items of details of the option that is selected is displayed in a pop-up manner (as pop-up display). In this way, it is possible to display a large number of functions in a user-friendly manner.

Moreover, it is possible to cause, for example, the photocopying machine to process a plurality of jobs. The photocopying machine displays a process state, for example, on a liquid crystal panel, while processing those jobs sequentially. On the other hand, the liquid crystal panel is provided with, for example, an interruption key for detecting (receiving) an interruption instruction from a user with respect to a job that is being processed or standing by, as a key for controlling the process of the jobs. For example, when the user presses the interruption key, the photocopying machine detects the interruption instruction, and is switched to an interruption mode so as to suspend an operation for the job that is being processed or standing by that are selected, and performs operation for another job.

As described above, in recent years, for use in an electronic apparatus capable of processing a plurality of jobs, used is a user-interfacing display apparatus provided with an interruption key for receiving an interruption instruction, the display apparatus being for displaying information as to a job, and displaying, in a pop-up manner, detail items of detail setting.

As an example of such user-interfacing display apparatus, Japanese Publication of Patent No. 2887800 (corresponding to Japanese Publication of Unexamined Patent Application, Tokukaihei, No. 1-270095 (published on Oct. 27, 1989) discloses a user-interfacing display apparatus for erasing display of a pop-up screen when the display apparatus is switched to an interruption mode while displaying the pop-up screen.

With the user-interfacing display apparatus, the pop-up screen is erased, for example, when, while the pop-up screen is displayed, another user presses the interruption key so that he can do recording. Thus, it is not necessary for the another user to erase the pop-up screen by himself. Therefore, it is possible to improve the user-interfacing display apparatus in user-friendliness.

Moreover, as another example of such user-interfacing display apparatus, Japanese Publication of Unexamined Patent Application, Tokukai, No. 2002-41202 (published on Feb. 8, 2002) discloses a user-interfacing display apparatus for changing display of a pop-up screen into a display character, such as an icon, a message, or the like, when the display apparatus is switched to an interruption mode while displaying the pop-up screen. With the user-interfacing display apparatus, a pop-up screen that is popped-up (expanded) is changed into a small display character such as an icon or a message, for example, when, while the pop-up screen is displayed, another user presses the interruption key so that he can perform recording. Thus, it is not necessary for the another user to erase the pop-up screen by himself. Therefore, it is possible to improve the user-interfacing display apparatus in user-friendliness. Moreover, it is possible to clearly indicate that the pop-up screen was displayed before the input by the interruption key, for example.

However, in each arrangement of those publications, how detail items displayed on the pop-up screen are set is not clear for users. The users may be confused by this.

Specifically, in the Japanese Publication of Patent No. 2887800 and the Japanese Publication of Unexamined Patent Application, Tokukai, No. 2002-41202 have such a problem that it is difficult to know whether setting displayed on the pop-up screen before switching into the interruption mode is valid or not, because the display of the pop-up screen popped-up to display (to perform extension display (popping-up) of) the detail items is erased, converted into an icon, or hidden behind the background screen. The users may be confused by this.

Moreover, in case the display of the pop-up screen is erased or converted into a display character, the users may be confused as to whether he should validate or invalidate the setting of the pop-up screen erased or converted into the display character, after the interruption mode is ended.

SUMMARY OF THE INVENTION

The present invention has an object to provide a user interfacing display apparatus and an image forming apparatus having operability improved without being confusing for a user as to setting displayed on a pop-up display as extension display.

In order to attain the forgoing object, a user interfacing display apparatus of the present invention for use in an electronic apparatus including (i) detail setting key for detecting what a user selects, and for performing detail setting of a job as to what a user selects, and (ii) a control section, capable of performing a plurality of jobs respectively in accordance with desired detail settings, for suspending a job that is being processed or a job that is standing by and performing another job, in accordance with an interruption instruction, the user interfacing display apparatus is provided with: an interruption key for detecting the interruption instruction, and transmitting the interruption instruction to the control section, the interruption key being capable of changing a display state thereof; a display section for displaying the desired detail settings; and a display control section for (iii) popping up, on the display section, a detail item of that one of the detail settings which is selected, when the detail setting key that is associated with the detail setting is selected, and (iv) changing the display state of the interruption key.

Here, the job may be a job for recording operation, a job for reading operation, or a job for other operation, in case the electronic apparatus is an image forming apparatus, for example.

Moreover, the interruption instruction, which is an instruction with respect to the job that is being processed, or the job that is standing by, is for suspending operation with respect to a job that is selected, and performing operation with respect to another job. The interruption instruction may be to perform a job that is inputted later before the job that is standing by.

Moreover, the popping up of the detail items may be display of a so-called pop-up screen such as overlapping display of screen (to display screens by overlapping those screens), and display of a window.

Moreover, the display state of the interruption key is, for example in case the interruption key is a soft key displayed on the display section, the display state in which the interruption key is displayed. Moreover, for example in case the interruption key is a hard key and is provided with a lamp, may be an ON/OFF state of the lamp.

In the above arrangement, the user interfacing display apparatus changes the display state of the interruption key when performing the pop-up display on the display section. Therefore, for example by appropriately changing the display state of the interruption key, it is possible to inform the user that the interruption key is not available, as described later. Moreover, for example, it is possible to promote the user to end the pop-up display.

Specifically, the user interfacing display apparatus, for example, (i) erases the interruption key on the display section, (ii) hides the interruption key behind a display screen on the display section, or (iii) displays the interruption key in gray (gray display; display in lighter color thickness) so as to display the interruption key in the unavailability display state, as the change in the display state of the interruption key. By appropriately changing the display state of the interruption key as described above, it is possible to inform the user that the interruption key is not available. Therefore, this will not let the user select the interruption key and change the electronic apparatus to the interruption mode.

This prevents the switching to the interruption mode while the pop-up screen is displayed as extension display. Hereby, the user will not be confused as to the detail setting displayed on the pop-up screen before the switching to the interruption mode, for example as to whether the detail setting is valid or not. Moreover, the user is promoted to select the interruption mode after the pop-up display is ended. Thus, the user ends the pop-up screen after checking the detail setting on the pop-up-screen, thereby avoiding confusing the user as to the detail setting.

Therefore, it is possible to provide a user interfacing display apparatus having improved operability without confusing the user as to the setting displayed on the pop-up display.

Here, in the related art described above, it is possible to switch to the interruption mode for suspending operation of a job and performing another job, for example, while a pop-up screen for displaying detail items. Therefore, the user can select the interruption mode before he completes setting displayed on the pop-up screen. This confuses the user as to whether the setting displayed by the popping-up is valid or invalid.

Therefore, in the present invention, the switching to the interruption mode is not allowed while the pop-up screen is displayed. Moreover, the present invention lets the user perform next operation including the switching to the interruption mode after he completes the setting displayed on the setting displayed by the popping-up. With this arrangement, it is possible to avoid confusing the user.

Note that the display section may display, for example, a state of process of the job that is being processed or that is standing by, besides displaying the detail setting as to the job.

Moreover, the electronic apparatus is not particularly limited, provided that the electronic apparatus is capable of performing a plurality of jobs in accordance with desired detail settings, and allowing interruption to the jobs.

Moreover, the user interfacing display apparatus of the present invention having the above arrangement may be so arranged that, on performing the popping-up on the display section, the display control section transmits to the control section an instruction to invalidate the interruption instruction detected via the interruption key.

According this arrangement, the display control section transmits to the control section an instruction to invalidate the interruption instruction, the interruption instruction detected via the interruption key after the transmission will be invalidated.

Therefore, it is possible to surely prevent the switching to the interruption mode while the pop-up screen is being displayed, thereby surely avoiding confusing the user.

Note that the transmission of the instruction may be carried out in any way.

Moreover, the user interfacing display apparatus having the above arrangement may be so arranged that, on ending the popping-up after the detail setting is completed, the display control section transmits to the control section an instruction to validate the interruption instruction detected via the interruption key.

In the arrangement, validated is the interruption instruction detected via the interruption key after the detail setting is completed and the pop-up display is ended. Therefore, after this, it is possible to switch to the interruption mode when the user presses the interruption key. Hereby, the user will not be confused as described above.

Note that the transmission of the instruction may be carried out in any way.

Moreover, the user interfacing display apparatus of the present invention having the above arrangement may be so arranged that the interruption key is a soft key that is displayed on the display section.

Here, the soft key is a key realized as a function of software. For example, in case the display section is a touch panel, it may be arranged that the soft key is displayed on the display section and pressure applied onto the soft key on the touch panel is detected, thereby realizing the interruption key. Moreover, for example, the interruption key may be realized by arranging such that an attention point can be moved by an arrow key or the like, and the soft key displayed on the display section is set as available.

According to the above arrangement, in which the interruption key is displayed on the display section, it is possible to easily change the display state of the interruption key. For example, as the change of the display state of the interruption key, the display of the interruption key may be erased so that the interruption key is not displayed. This provides a user-friendly user interface.

Moreover, the user interfacing display apparatus of the present invention having the above arrangement may be so arranged that, on performing the popping-up on the display section, the display control section erases display of the interruption key.

In the above arrangement, the display of the interruption key is erased, when the pop-up display is performed on the display section, that is for example, the pop-up screen is displayed on the display section. This will not let the user select the interruption key. Therefore, it is possible to surely prevent the switching to the interruption mode while the pop-up screen is being displayed, thereby avoiding confusing the user.

Furthermore, the user interfacing display apparatus of the present invention having the above arrangement, may be so arranged that, on performing the popping-up on the display section, the display control section hides at least part of the interruption key by performing the popping-up.

In the arrangement, at least part of the interruption key is hidden behind the pop-up screen popped up, when the pop-up screen is displayed as extension display of the detail items. Hereby, it is possible to prevent the user from selecting the interruption key, and to clearly inform the user that the interruption key is unavailable (cannot be selected).

Therefore, because the user is not allowed to select the interruption key, it is possible to surely prevent the switching to the interruption mode while the pop-up screen is being displayed, thereby avoiding confusing the user.

Moreover, according to the above arrangement, it is possible to clearly inform the user that the interruption key becomes available again, when the setting on the pop-up screen is ended.

Moreover, the user interfacing display apparatus of the present invention having the above arrangement may be so arranged that, on performing the popping-up on the display section, the display control means changes the display state of the interruption key to an unavailability display state informing that interruption is unavailable.

Here, the display in the unavailability display state (unavailability display) includes, for example, a gray display by which what has been displayed in a predetermined color thickness is displayed in a lighter color thickness. Besides this, the unavailability display includes, for example, an arrangement in which a dot line is used for indicating the unavailability.

According to the above arrangement, it is possible to clearly inform the user that the interruption key is unavailable by using the unavailability display, while, for example, the pop-up screen is displayed so as to display the detail items in a pop-up screen. Therefore, the user is not allowed to select the interruption key. Hereby, it is avoided to confuse the user.

Moreover, the user interfacing display apparatus of the present invention may be so arranged that, on ending the popping-up after the detail setting is completed, the display control section changes back the display state of the interruption key to a display state displayed before the popping-up is performed (so as to be displayed as before the popping-up is performed).

In the above arrangement, the interruption key is displayed again after the display of the pop-up screen is ended, in case where the interruption key has been erased as the pop-up screen was popped up so as to display the detail items, for example. Moreover, the display state is changed back to the one to indicate that the interruption key is available, in case the display state of the interruption key has been changed to the display for indicating that the interruption key is unavailable (display in the unavailability display state, unavailability display), as the pop-up screen was popped up so as to display the detail items, for example. Therefore, it is possible to clearly inform the user that the interruption key becomes available. Therefore, it is possible to provide a fast user interface.

Furthermore, the user interfacing display apparatus of the present invention having the above arrangement is so arranged as to further include a warning section for warning the user, so that the display control section warns the user by using the warning section when detecting that the interruption key is selected while the popping-up is being performed on the display section.

In the above arrangement, the user is warned when it is detected that the user selects the interruption key. Thus, it is possible to surely inform the user that the interruption key is not available. Note that the warning may be carried out by using a warning message or a warning sound in the above arrangement.

In order to attain the forgoing object, an image forming apparatus of the present invention is an electronic apparatus including any one of the user interfacing display apparatus.

The image forming apparatus is capable of performing a plurality of jobs for recording operation, reading operation, and the like. The image forming apparatus performs the pop-up display (extension display; popping-up) for the detail setting when detecting what the user selects, and changes the display state of the interruption key. Moreover, the image forming apparatus may be a digital photocopying apparatus.

Therefore, this prevents the switching to the interruption mode while the pop-up screen displayed, thereby avoiding confusing the user, for example, as to the detail setting displayed on the pop-up screen before the switching to the interruption mode. Moreover, the user is promoted to select the interruption mode after the pop-up display is surely ended, thereby avoiding confusing the user.

Therefore, it is possible to provide an image forming apparatus having improved operability without confusing the user as to the setting displayed on the pop-up screen.

For a fuller understanding of the nature and advantages of the invention, reference should be made to the ensuing detailed description taken in conjunction with the accompanying drawings.

DETAILED DESCRIPTION OF THE PREFERRED EMBODIMENTS

A user-interfacing display apparatus of the present invention is provided in an image forming apparatus as an electronic apparatus being capable of performing a plurality of jobs in accordance with detail setting and including control means for suspending a job that is being process or standing by, and performing another job. The user-interfacing display apparatus is provided with an interruption key and a display section for displaying the detail setting. When the user-interfacing display apparatus detects that detail setting key is selected, the user-interfacing display apparatus displays, in a pop-up manner on the display section, detail items of the detail setting that is in accordance with the selection. In this way, the functions are displayed in a user-friendly manner.

Moreover, the user-interfacing display apparatus is so arranged that a display state of the interruption key can be changed. Thus, when the display in the pop-up manner is performed, the display state of the interruption key is changed. With this arrangement, as described later, it is possible to provide a user-interfacing display apparatus, which is more user friendly and will not confuse a user.

An embodiment of the present embodiment will be described below, referring to FIGS. 1 to 10.

Figure 2:
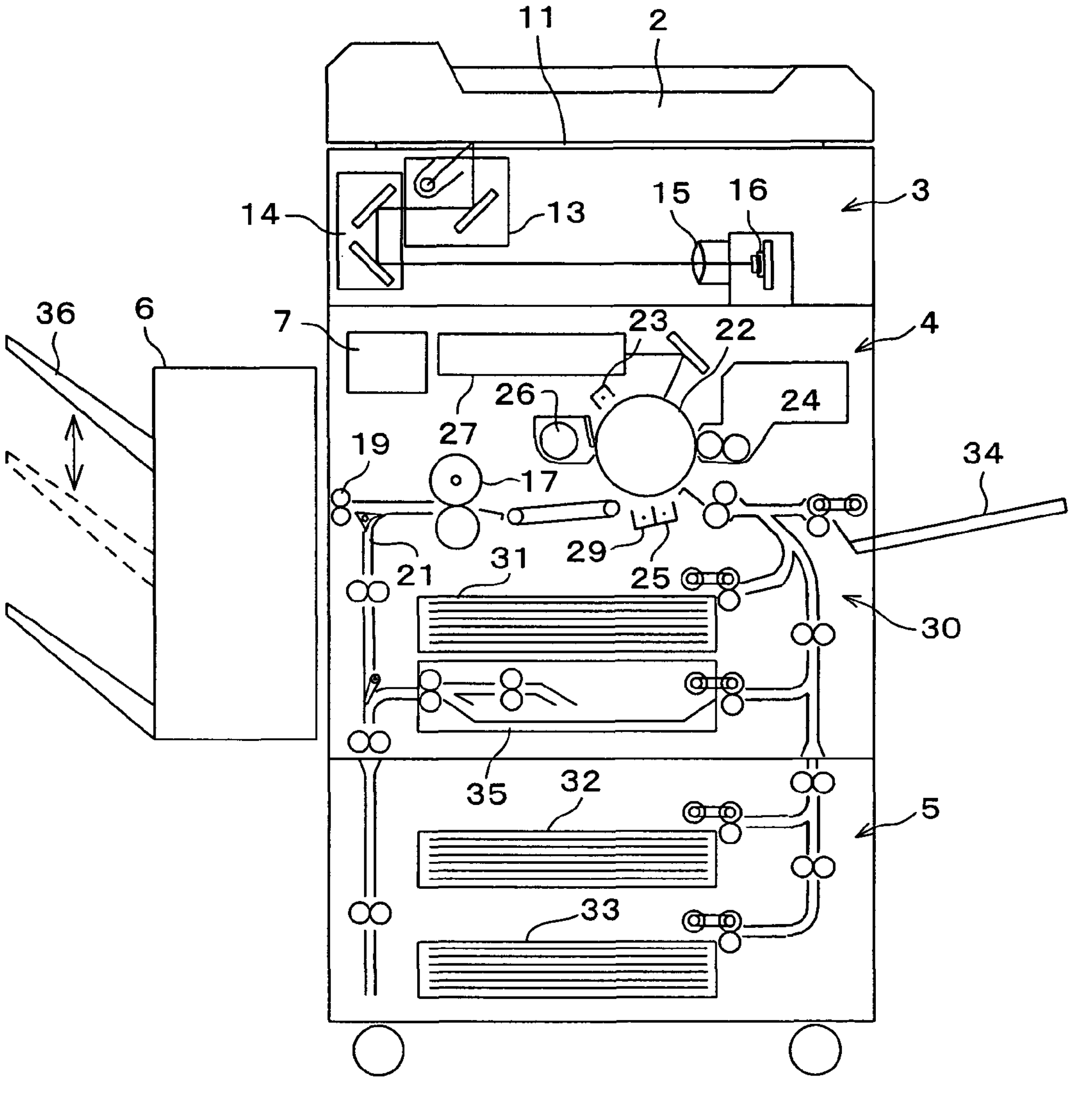
FIG. 2 is a sectional view schematically illustrating an embodiment of an image forming apparatus of the present invention.

Referring to FIG. 2, a digital photocopying machine (an image forming apparatus, an electronic apparatus) of the present embodiment is described. The digital photocopying apparatus 1 is capable of reading an image, for example, from a document (not shown), so as to generate image data, and printing out, on a sheet for printing (not shown), the image data thus generated, or image data that is transferred from an external apparatus.

The digital photocopying machine 1 is schematically provided with an automatic document feeder 2, a document reading section 3, an image forming section 4, a multi-staged sheet feeding section 5, and a post process apparatus 6.

The automatic document feeder 2 is located on a document table 11 made of transparent glass. The document table 11 is located at an upper part of the digital photocopying machine 1.

In accordance with an instruction given by using, for example, a operation panel (user-interfacing display apparatus) (not shown), the automatic document feeder 2 conveys, one by one, documents set on a document set tray, to the document table 11.

The document reading section 3, located below the document table 11, scans and reads an image of a document placed on the document table 11.

The document reading section 3 is provided with a first scanning unit 13, a second scanning unit 14, an optical lens 15, a CCD line sensor 16, which is a photoelectric conversion element.

The first scanning unit 13 is provided with (i) a lighting lamp unit for radiating light on a surface of the documents, (ii) a first mirror for reflecting, to a predetermined direction, a reflected image from the document, and (iii) the like. The second scanning unit 14 is provided with a second mirror and a third mirror for directing, to the CCD line sensor 16, reflection light reflected from the first mirror. The optical lens 15 focuses on the CCD line sensor 16 the reflection light from the document, so as to form an image on the CCD line sensor 16.

Moreover, the document reading section 3, operating in association with the automatic document feeder 2, reads, at a predetermined lighting position, the image of document automatically conveyed by the automatic document feeder 2.

Image data of the document thus read by the document reading section 3 is transmitted to an image data input section (not shown). The image data input section performs a predetermined image process on the image data. After that, the image data is temporally stored in a main memory for storing image data. The main memory is located in a control section (control mean) 7 of the image forming section 4. Then, a central processing section of the control section 7 reads out the image from the main memory in accordance with an output instruction, and transfers the image to a laser writing unit 27, which is an optical writing apparatus of the image forming section 4.

The laser writing unit 27 of the image forming section 4 is provided with an image data output section, a semiconductor laser beam source, a polygon mirror, a f-θ lens, and the like (all not shown). In accordance with control by the image data output section, the semiconductor laser beam source reads out the image data that is stored in the main memory after being transferred from the document reading section 3 or from the external apparatus, and outputs a laser beam in accordance with the image data. The polygon mirror performs isogonic speed polarization of the laser beam. The f-θ lens compensates the laser beam that has been polarized at an isogonic speed, so as to cause the laser beam to be polarized on an exposure drum at the isogonic speed.

Note that an optical writing apparatus of a fixed scanning type using a light emitting array such as an LED (light emitting diode), an EL (electro luminescence), or the like may be used even though the laser writing unit 27 is used as the optical writing apparatus in the present embodiment.

Besides those sections, the image forming section 4 is provided with, around the exposure drum 22, an electric charging device 23, a development device 24, a transcription device 25 (such as a transcription charger, or the like), a cleaning device 26, an electric discharging device (discharging charger) 29. The electric charging device 23 electrifies the exposure drum 22 to a predetermined potential. The development device 24 supplies the toner onto an electrostatic latent image formed on the exposure drum 22 so as to develop the latent image. The transcription device 25 transcribes, onto the printing sheet, the toner image formed on the exposure drum 22. The cleaning device 26 recollects excess toner.

In the image forming section 4 having the above arrangement, a toner image is formed on the exposure drum 22, in accordance with the image data, while a printing sheet (a sheet for printing) (not shown) is conveyed to the exposure drum 22. The transcription device 25 transcribes the toner on the printing sheet.

The printing sheet on which the toner image in accordance with the image data is transcribed is conveyed to a fixing unit 17 so that the toner is fixed on the printing sheet.

In a delivering-out part of the image forming section 4, besides the fixing unit 17, a switch back path 21 is provided. The switch back path 21 turns over the printing sheet in case a reverse side of the printing sheet is to be printed after the front side of the printing sheet is printed (2-side printing). The printing sheet on which the toner is fixed by the fixing unit 17 is, if necessary, conveyed to the post process apparatus 6 by a sheet-feeding roller 19 via the switchback path 21.

The post process apparatus 6 performs staple process and the like process on the printing sheet on which the printing is done. The post process apparatus 6 is provided with an elevating tray 36. The printing sheet sent (conveyed) to the post process apparatus 6 is subjected to a predetermined process in the post process apparatus 6, and is delivered out.

Here, the digital photocopying machine 1 is provided with a manual feeding tray 34, a 2-side unit 35, a sheet tray 31, and sheet-feeding trays 32 and 33. The manual feeding tray 34, which is means for feeding the printing sheet to the image forming section 4, is located on a side of the digital photocopying machine 1. The sheet-feeding trays 32 and 33 are provided in the multi-staged sheet feeding section 5 located under the image forming section 4. Moreover, the digital photocopying machine 1 is provided with conveying means 30 for conveying, to a transcription position, the printing sheet supplied from those trays 31, 32, 33, and 34. The transcription position is in the image forming section 4 and the transcription device 25 is located thereat. The 2-side unit 35, which is connected with the switch back path 21 for turning over the printing sheet, is used when both the sides of the printing sheet are to be printed (2-side printing). Note that the 2-side unit 35 may be replaced with a normal sheet cassette (sheet tray). Thus, the digital photocopying machine 1 may be so arranged as to include such normal sheet cassette, instead of the 2-side unit 35.

Figure 3:
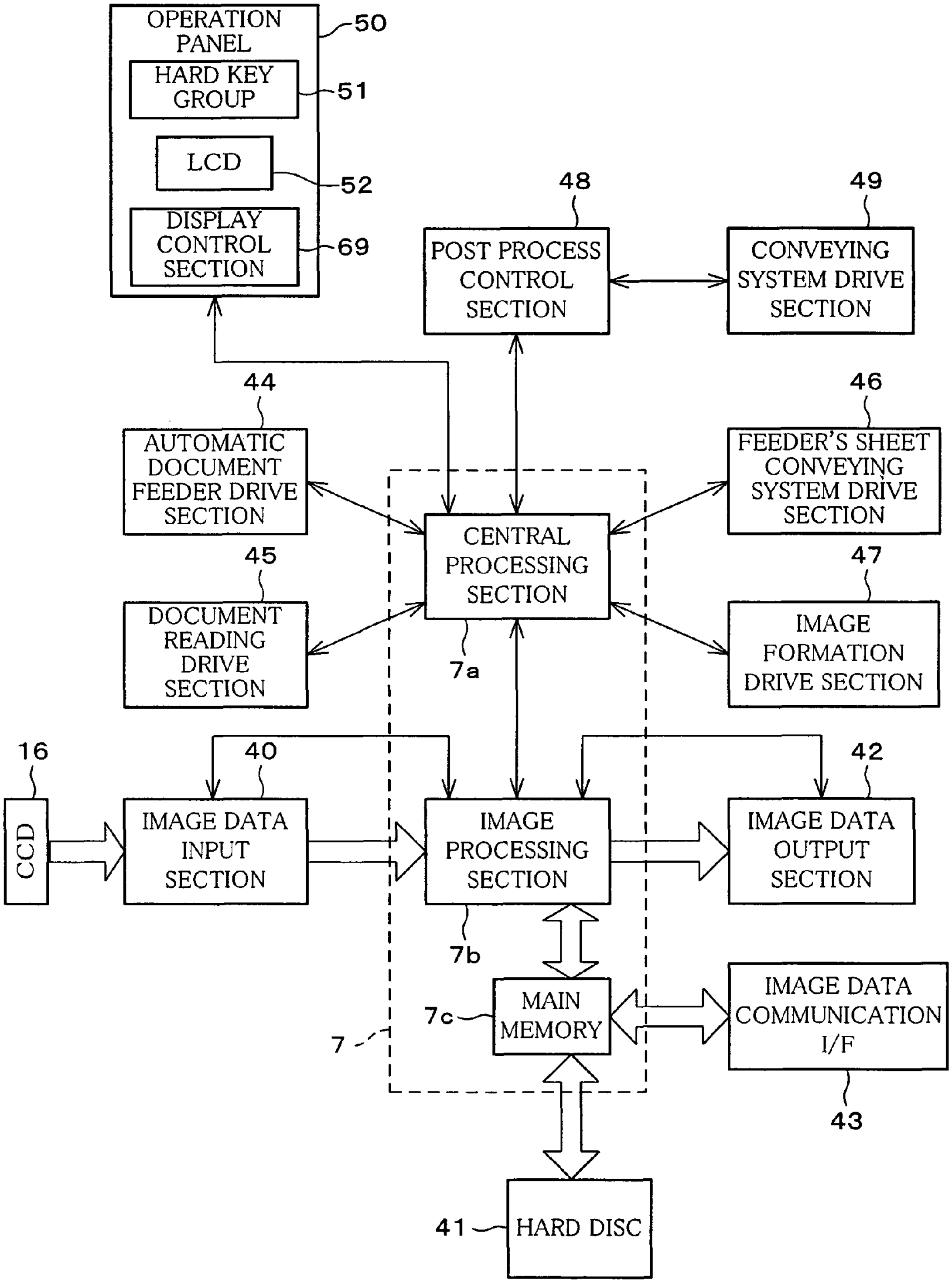
FIG. 3 is a block diagram schematically illustrating the image forming apparatus.

Next, the following describes an arrangement of the digital photocopying machine 1, referring to FIG. 3.

FIG. 3 is a block diagram showing a flow of the image data and a control signal in the digital photocopying machine 1.

In the digital photocopying machine 1, a central processing section 7*a* provided in the control section 7 manages the operation of each section.

The central processing section 7*a*, which is connected with an image processing section 7*b*, is also connected with, for example, the automatic document feeder 2, an automatic document feeder drive section 44, a document reading drive section 45, a sheet feeding/conveying system drive section 46, an image formation drive section 47, a post process control section 48, and the like. The automatic document feeder drive section 44, the document reading drive section 45, the feeder's sheet conveying system drive section 46, the image formation drive section 47, and the post process control section 48 are driving systems for the sections, such as the post process section 6, of the digital photocopying apparatus 1. The central processing section 7*a* manages each section connected thereto by sequence control, and outputs the control signal to each section.

For example, the post process control section 48 controls a conveying system drive section 49, in accordance with the control signal from the central processing section 7*a*, so as to drive the post process apparatus 6. Similarly, the other driving systems, namely, the automatic document feeder drive section 44, the document reading drive section 45, the feeder's sheet conveying system drive section 46, and the image formation drive section 47, control a motor, a clutch, a switch, a solenoid, (not shown) a high voltage and the like, in accordance with the control signal from the central processing section 7*a*. Note that, in FIG. 3, sections driven by those drive sections, namely, the automatic document feeder drive section 44, the document reading drive section 45, the feeder's sheet conveying system drive section 46, and the image formation drive section 47, are not shown for the sake of easy explanation.

Moreover, the image processing section 7*b*, which is connected with the central processing section 7*a*, is also connected with an image data input section 40 and an image data output section 42. In this arrangement, the image data input section 40 is a control section of the document reading section 4 shown in FIG. 2. Moreover, the image data output section 42 is a control section of the laser writing unit 27.

Moreover, the central processing section 7*a* is connected with an operation panel (user-interfacing display apparatus) 50 so that the central processing section 7*a* can mutually communicate with the operation panel 50. The operation panel 50 is provided with a hard key group 51, an LCD (Liquid Crystal Display) (display section) 52, and a display control section (display control means, warning means) 69.

When the user presses a key of the hard key group 51 or a soft key on the LCD 52, the operation panel 50 detects key input, and transmits, to the central processing section 7*a*, a control signal indicative of content of a photocopying mode that is in accordance with setting thus inputted. Then, the whole digital photocopying machine 1 performs operation that is in accordance with the mode thus set.

Moreover, a control signal indicative of various operation states of the digital photocopying machine 1 is transmitted from the central processing section 7*a* to the operation panel 50, so as to display the various operation conditions on the LCD via the display control section 69. Hereby, it is possible to inform the user a current state of the photocopying machine 1, for example.

Here, in the above arrangement, for example, operation of reading an image is performed as follows. For example, in accordance with an instruction from the user, which is given via the operation panel 50, a document (not shown) is conveyed in, and image data thereof is read in by the CCD line sensor 16. The image data is transmitted to a main memory 7*c* via the image data input section 40 and the image processing section 7*b*. Note that the image data is stored in a hard disc 41, if necessary. Moreover, for example, in accordance with an instruction from the user, which is given via the operation panel 50, the image data is received from the external apparatus (not shown) via an image data communication I/F (interface) 43, and stored in the main memory 7*c*.

Here, details of the operation panel 50 is explained below, referring to FIG. 4. The operation panel 50 is provided with the hard key group 51 and the LCD 52.

The hard key group 51 is provided with ten keys 53, a clear key 54, an all-clear key 55, and a start key (print start key) 56.

The ten keys 53 are keys used for inputting optional numerical values among setting values displayed on the LCD 52. Examples of the optional numerical values are a number of copies, or a number of sets of copies. The clear key 54 is a key for clearing the setting values displayed on the LCD 52. Moreover, for example, if the clear key 54 is pressed during photocopying operation, the photocopying operation is interrupted and the setting as to the number of copies is cleared. Accordingly, rest of the photocopying operation is stopped. The all-clear key 55 is a key for returning to a default value, the setting values for photocopying. The start key 56 is a key for instructing start of the photocopying operation.

Note that the clear key 54 and the interruption key are different in the following points: The clear key 54, for example, is used so as to interrupt a job in process, clear the number of copies, and stop resuming of the job, while the job is normally resumed with setting partially changed. On the other hand, the interruption key is used, for example, so as to temporally interrupt a job in process, and resume the job thus interrupted after the interruption is ended.

Figure 5:
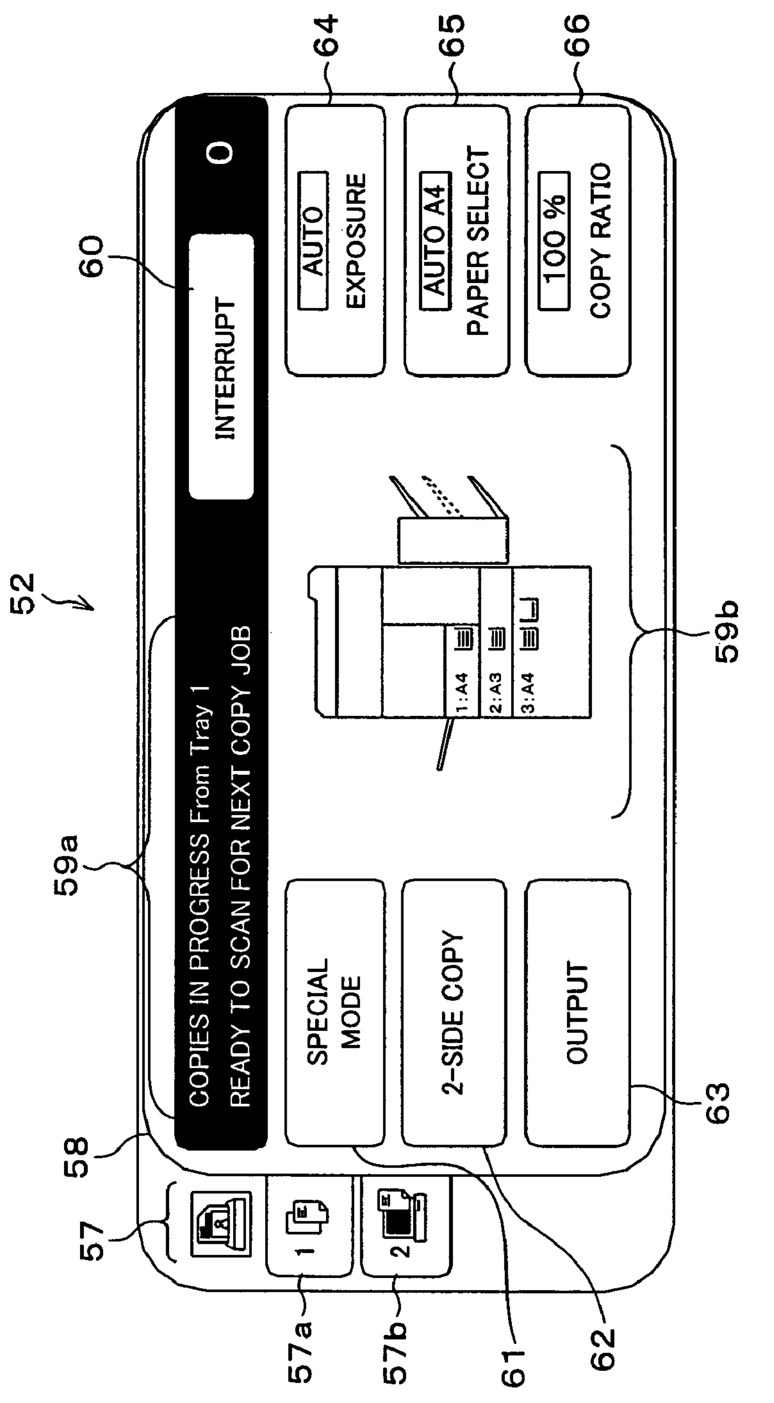
FIG. 5 is a plan view illustrating part of the user-interfacing display apparatus.

The LCD 53 will be explained in detail below, referring to FIG. 5. The LCD 52 of the present embodiment is a liquid crystal display apparatus of a touch panel type.

On a display screen of the LCD 52, various screens are displayed by switching over. In those screens, touch keys (soft keys) for setting various conditions are displayed. For example, as shown in FIG. 5, on a screen 58, displayed as such touch keys are an interruption key (soft key) 60, a special mode key 61, a 2-side copy key 62, an output key 63, an auto/exposure key 64, a paper selection key 65, and a copy ratio key 66. When the LCD 52 detects that a user inputs via the touch keys, that is, for example, pressing operation by a finger, the LCD 52 sets various conditions in accordance with the input, by using the control section 7 and the display control section 69. Moreover, guidance as to the operation, warning by the display control section 69 as the warning means, and the like information are also displayed on the LCD 52. Note that the interruption key 60 is displayed on the LCD 52, and the display condition is changeable.

Note that the controlling the operation panel 50 by detecting the pressure applied onto the hard key group and the touch keys, is not limited to a particular arrangement, and may be realized by using a computer to execute software, or by providing a semiconductor elements so as to realize the arrangement as a hardware.

Moreover, on the display screen of the LCD 52, a message area 59*a* for showing an operation state of the digital photocopying apparatus 1, and an icon area 59*b* for showing a setting state of the digital photocopying apparatus 1 are displayed.

Here, displayed out of the screen 58 and on left hand side of the LCD 52, is a job list 57 for displaying a job that is being processed or standing by. In the present embodiment, as the display of the job list 57, displayed are a (proceeding) job 57*a* that is currently being processed, and a (standing-by) job 57*b* that is standing by to be processed next. Note that, further standing-by jobs are listed below the standing-by job 57*b*, following the job 57*b*.

The interruption key 60 of the present embodiment is displayed only when such proceeding job 57*a* or standing-by job 57*b*. The interruption key 60 is used, for example in case a photocopying job is in process, so as to stop photocopying and to perform another process.

The keys located both sides of the icon area 59*b*, namely, the special mode key 61, the 2-side copy key 62, the output key 63, the auto/exposure key 64, the paper select key 65, the copy ratio key 66, and the like are detail setting keys for setting the photocopying in detail in the digital photocopying apparatus 1. When a user presses those keys, which is displayed as kinds of options of the detail setting respectively, the operation panel 50 detects the pressure applied on the keys, and considers that the user selects the kind of the option of the key displayed on the LCD 52 and pressed by the user. Then, the operation panel 50 performs pop-up display of detail items of the kind of option thus selected. In other words, when the detail setting key is pressed, the pop-up screen is displayed by the display control section 69.

Figure 1:
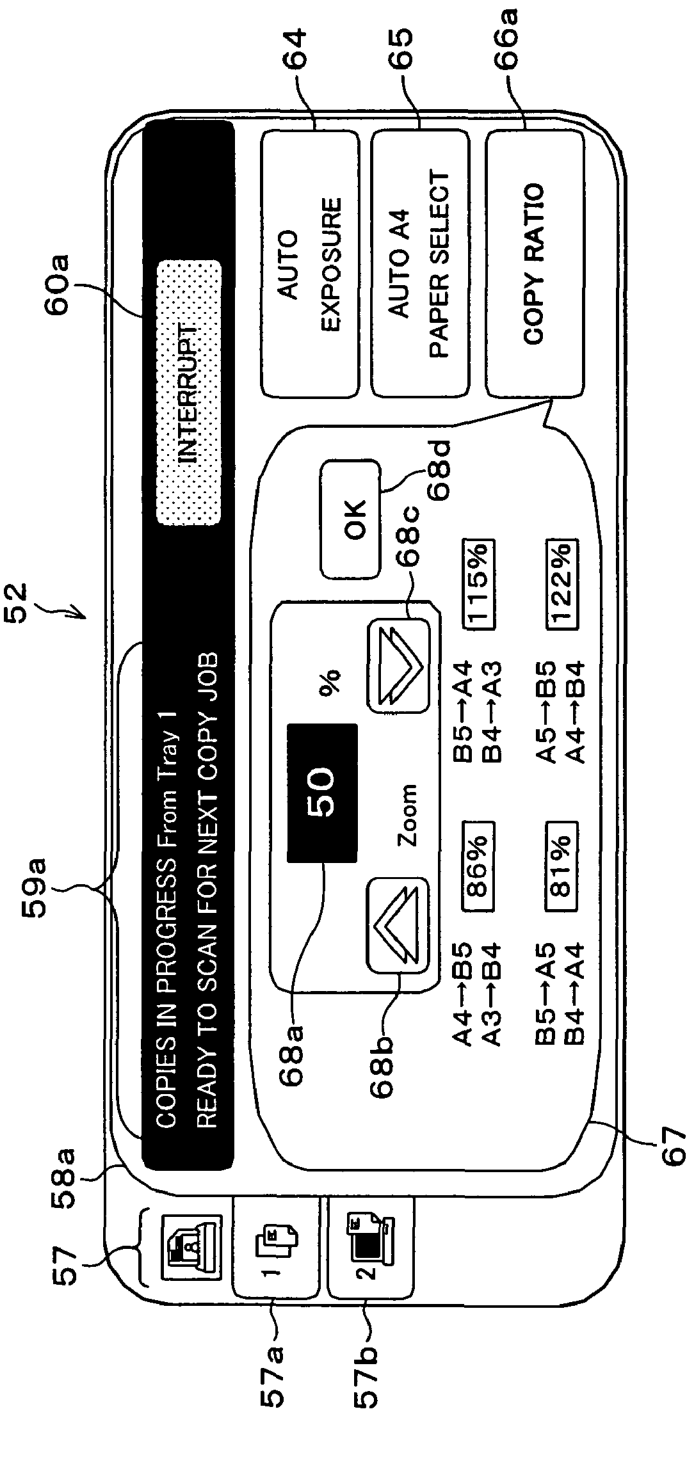
FIG. 1 is a plan view illustrating part of an embodiment of a user-interfacing display apparatus of the present invention.

For example, when the copy ratio key 66 is pressed, as shown in FIG. 1, the pop-up screen 67 is displayed. In this case, displayed on a screen 58*a* of the LCD 52 is an interruption key 60*a* whose display state is changed in accordance with the control by the display control section 69. The interruption key 60*a* is displayed in gray by displaying the interruption key 60*a* in lighter color thickness, thereby informing the user that the interruption key 60*a* is not available (cannot be selected). Moreover, in order to more distinctly show that the pop-up screen 67 thereof is being displayed, a copy ratio key 66*a* is displayed instead of the copy ratio key 66. Here, as the interruption key 60*a* is displayed in gray so as to show that the interruption key 60*a* is not available, it is so set that instruction for interruption given by the interruption key 60*a* will be invalidated.

On the pop-up screen 67, a copy ratio display 68*a*, an enlargement key 68*b*, a reduction key 68*c*, an OK key 68*d*, and the like are displayed as the detail items. Moreover, below those keys 68*a* to 68*d*, copy ratios for typical sheet sizes are displayed, as reference for the user to select a copy ratio. For example, by using the enlargement key 68*b* or the reduction key 68*c*, it is possible to increase (enlargement) or decrease (reduction) the copy ratio displayed in a copy ratio display 68*a*. Note that in this display state, warning is displayed on the LCD 52, for example, when the interruption key 60*a*, which is displayed as unavailable, is pressed by the user.

Figure 6:
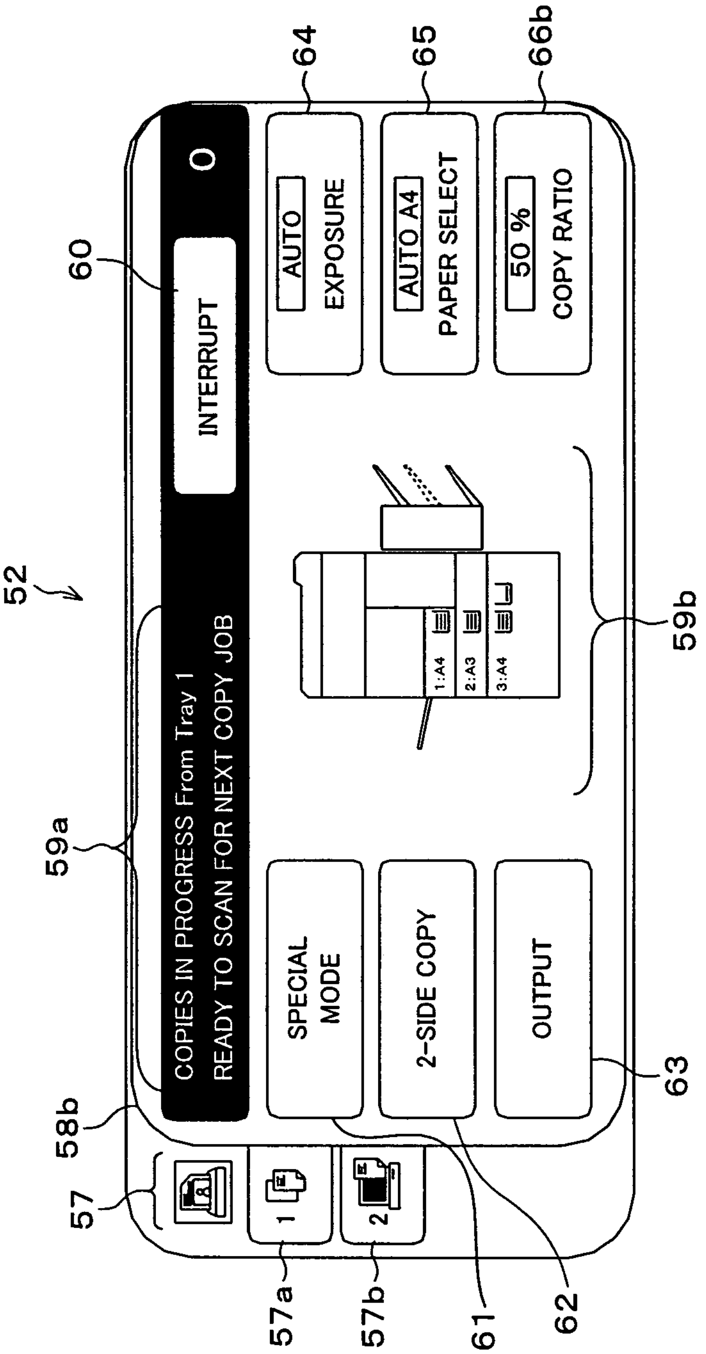
FIG. 6 is a plan view illustrating part of the user-interfacing display apparatus in a state different from that of FIG. 5.

When the user presses the OK key 68*d*, it is judged that the detail setting is completed, and the pop-up display is ended as shown in FIG. 6, while the copy ratio indicated in the copy ratio display 68*a* is set as indicated by the copy ratio key 66*b*. Moreover, the interruption key 60*a* is replaced with the interruption key 60. Note that, as the interruption key 60*a* is replaced with the interruption key 60, it is set that the instruction for interruption (interruption instruction) given via the interruption key 60 will be valid.

Figure 7:
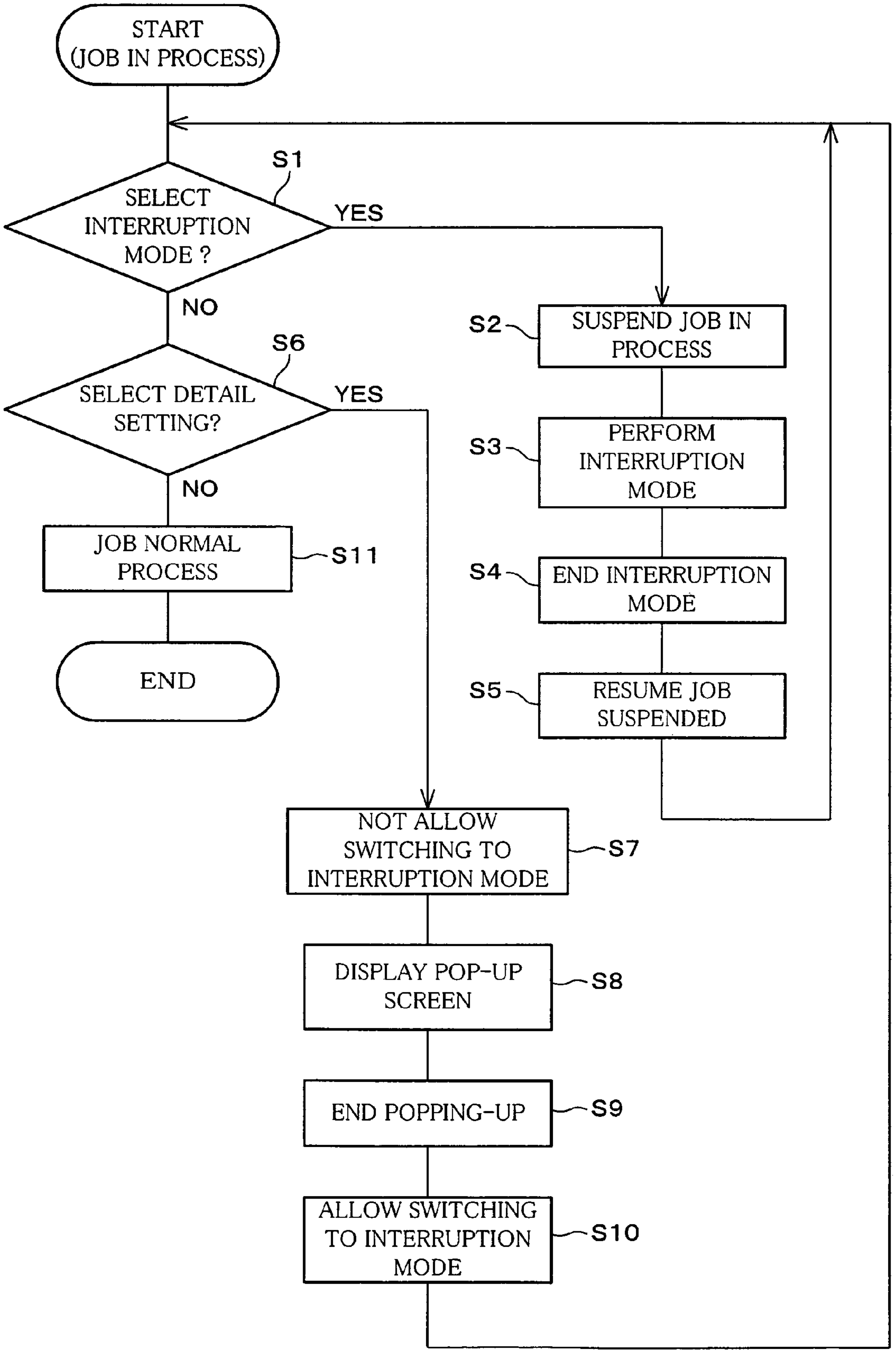
FIG. 7 is a flow chart showing operation of the image forming apparatus.
Figure 8:
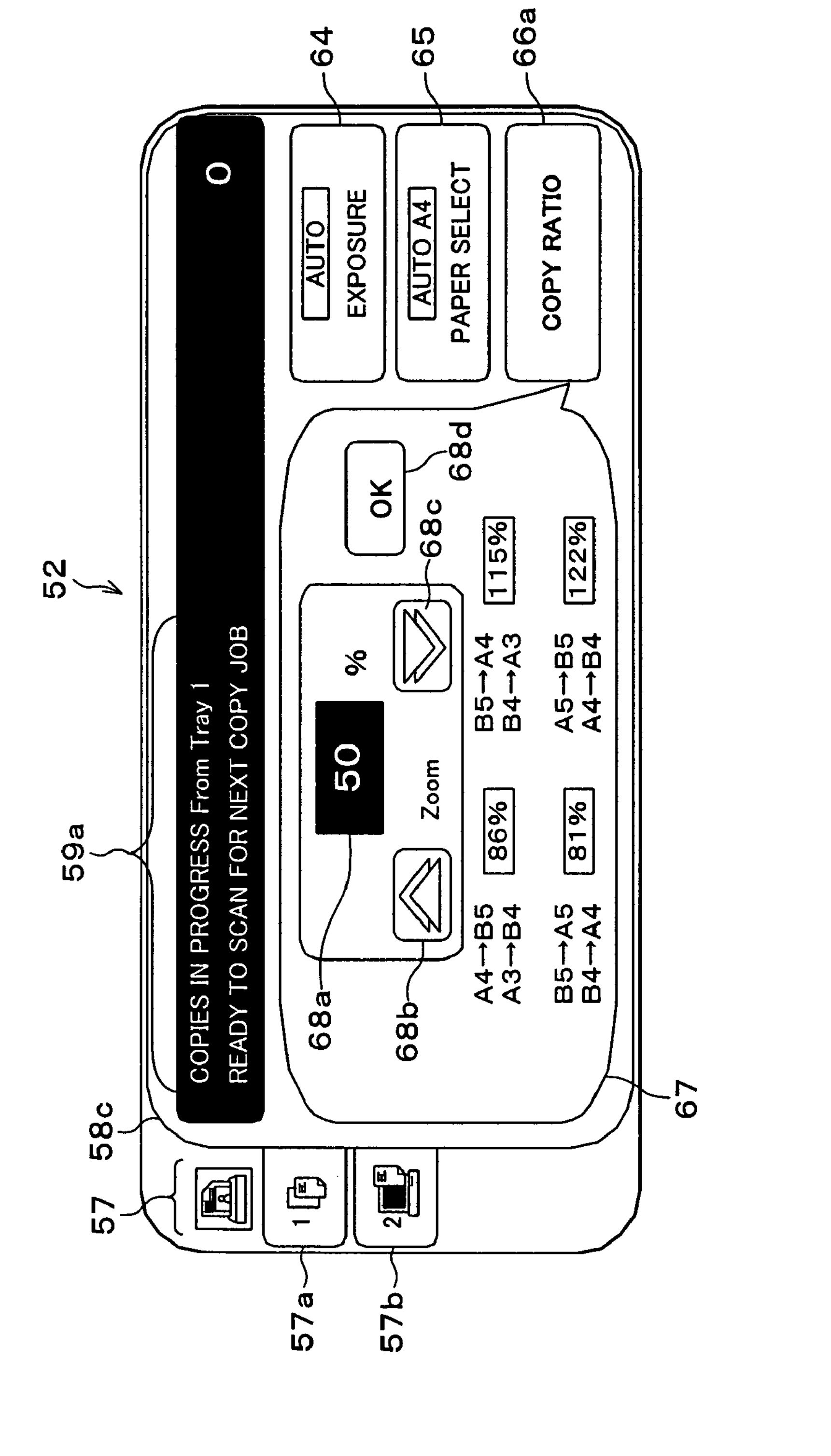
FIG. 8 is a plan view illustrating part of another embodiment of the user-interfacing display apparatus of the present invention.

Next, the process on the operation panel 50 from the start of the pop-up display to the end of the pop-up display will be discussed, referring to FIG. 7.

Figure 4:
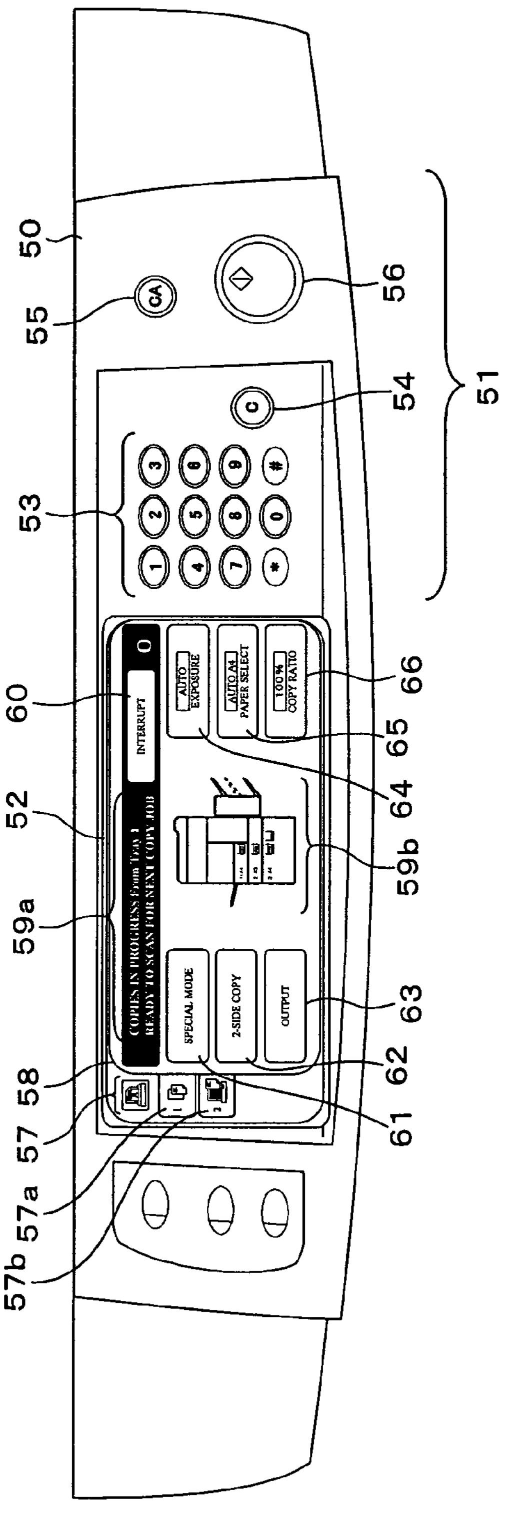
FIG. 4 is a plan view illustrating the user-interfacing display apparatus.

In the digital photocopying apparatus 1, for example as shown in FIG. 4, the process is started in a state where there is a job that is currently being processed.

At Step S1, detected is whether or not the interruption key 60 is pressed. When it is detected that the interruption key 60 is pressed, it is judged that interruption mode is selected, and the process goes to S2. In case pressing of the interruption key 60 is not detected, the process goes to step S6.

At S2 for the case where the interruption mode is selected, the job in process is suspended. Next, at S3, the interruption mode is performed, for example, thereby processing a desired job preferentially. At S4, the interruption mode is ended. Then, at S5, the job suspended is resumed. Further, going back to S1, whether or not the interruption key 60 is pressed is detected.

At S6 for the case the interruption mode is not selected at S1, detected is whether or not the detail setting keys are pressed or not. When it is detected that detail setting key (at least one of the detail setting keys) is pressed, the process goes to S7. In case pressing of the detail setting key is not detected, the process goes to S11. At S11, as the normal process, the job that is being currently processed, and the job that is standing by, are processed orderly, and then the process is terminated.

At S7 for the case where it is detected that the detail setting key is detected, the display state of the interruption key 60 on the LCD 52 of the operation panel 50 is changed to, for example as shown in FIG. 1, display of unavailable, while the interruption key 60 is invalidated, so as not to allow switching to the interruption mode.

Thereafter, the pop-up screen regarding the detail setting selected at S6 is displayed at S8.

Specifically, at S7 and S8, for example, the pop-up screen is displayed, and the display state of the interruption key 60 is changed to the interruption key 60*a*. Meanwhile, it is set so that the interruption instruction given by using the interruption key 60*a* will be invalid.

Furthermore, it is possible to perform detail setting by detecting, for example, setting on the pop-up screen 67 as shown in FIG. 1. At S9, when, for example, pressing of the OK key 68*d* is detected, the detail setting shown in the pop-up screen 67 is confirmed, and the display of the pop-up screen 67 is ended. For example, as shown in FIG. 1, the OK key 68*d* is pressed after setting the copy ratio to 50%, the copy ratio is set to 50%, as shown on the screen 58*b* illustrated in FIG. 6. Next, at S10, the display state of the interruption key 60 on the LCD 52 of the operation panel 50 is changed back, for example, as shown in FIG. 3. Meanwhile, the interruption key 60 is validated, so as to allow switching to the interruption mode.

Specifically, at S9 and S10, for example, the display of the pop-up screen 67 is ended, and the display state of the interruption key 60*a* is changed back to that of the interruption key 60. Moreover, it is set so that the interruption instruction given by using the interruption key 60 will be valid.

Thereafter, going back to S1, it is detected whether or not the interruption key 60 is pressed.

Note that, between S7 to S9, after not allowing the switching to the interruption mode at S7, and before allowing the switching to the interruption mode at S10, the operation panel 50 displays a warning message on the LCD 52, when the pressure on the interruption key 60*a*, displayed as unavailable as shown in FIG. 1 for example, is detected. The warning may be carried out in other ways, such as buzzing a warning sound.

Figure 9:
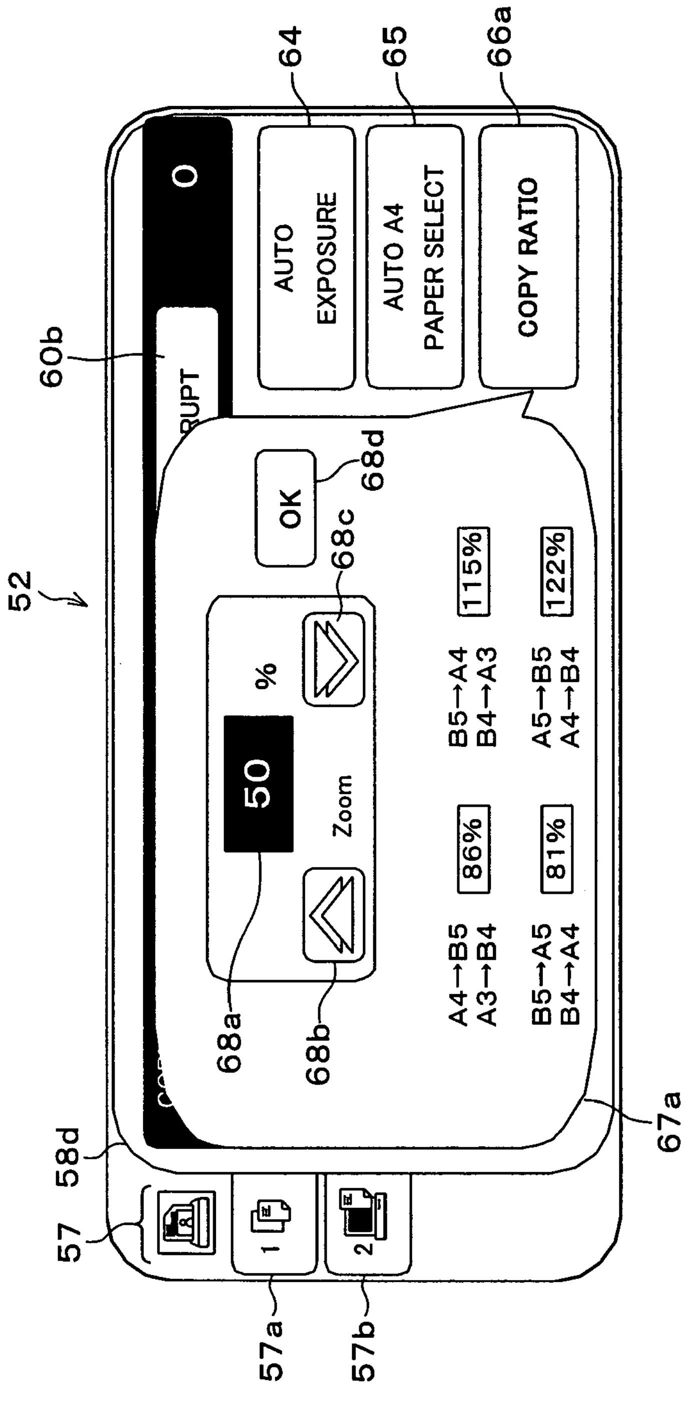
FIG. 9 is a plan view illustrating part of still another embodiment of the user-interfacing display apparatus of the present invention.

The arrangement in which the pop-up display 67 is displayed while the display of the interruption key 60 is replaced with the display of the interruption key 60*a* is explained above, referring to FIG. 1. However, it should be noted that the present invention is not limited to this arrangement. For example, the present invention may be so arranged that the interruption key is erased, while the pop-up screen 67 is displayed on the screen 58*c*. Moreover, for example, as shown in FIG. 9, the pop-up screen 67*a* is displayed on the screen 58*d*, so as to partially hide the interruption key 60*b* behind the pop-up screen 67*a*.

Figure 10:
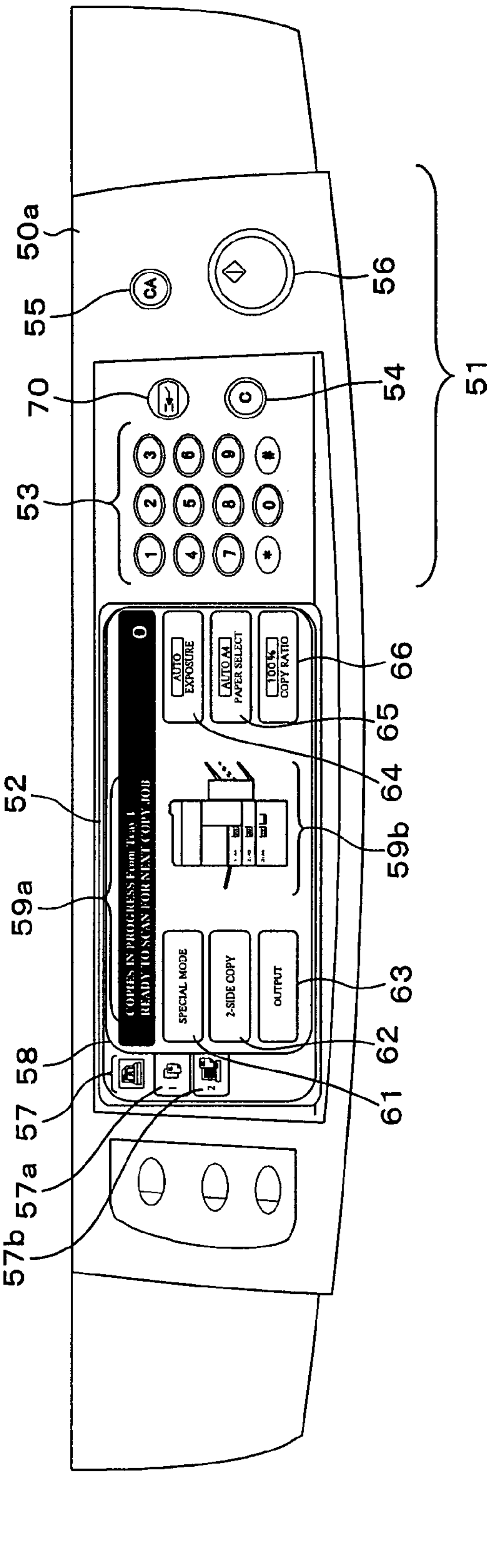
FIG. 10 is a plan view illustrating yet another embodiment of the user-interfacing display apparatus of the present invention.

Moreover, referring to FIG. 4, explained above is the arrangement in which the LCD 52 is provided with the interruption key 60, which is a soft key. However, it should be noted that the present invention is not limited to this arrangement. For example, as shown in FIG. 10, the present invention may have such an arrangement that an operation panel 50*a* is provided with, in the hard key group 51, an interruption key 70, which is a hard key.

The interruption key 70 has a lamp to indicate to the user whether the user can select the interruption mode or not (whether the interruption mode is available or unavailable), by changing a display state. For example, the lamp is turned ON when the interruption mode is available, whereas the lamp is turned OFF when the interruption mode is unavailable. In this way, it is possible to inform the user whether the interruption mode is available or unavailable, by turning ON or OFF the lamp in accordance with the display of the pop-up screen. This process is carried out in the same way as in FIG. 7.

Moreover, the turning ON and OFF of the lamp of the interruption key 7 is not limited to the procedure, provided that the lamp is turned ON and OFF in accordance with the display of the pop-up screen. For example, it may be so arranged that the lamp is turned ON when the switching is not allowed, whereas the lamp is turned OFF when the switching is allowed. Moreover, in the arrangement in which the interruption key is provided as a hard key, the changing of the display state is not limited to the combination of turning ON and OFF of the lamp. The display state may be changed by changing color of light of the lamp, or by physically changing protrusion state of the interruption key on the control panel.

As described above, the operation panels 50 and 50*a*, as user interfacing display apparatuses, have such arrangement that the display state of the interruption key 60 or 70 is changed to, for example, that of the interruption key 60*a* or 60*b*, when the pop-up screen 67 or 67*a* is displayed, as the pop-up display, on the LCD 52. Moreover, the digital photocopying machine 1, as an electronic apparatus and an image forming apparatus, is provided with the operation panel 50 or 50*a*.

Therefore, the switching to the interruption mode is prevented while the pop-up screen 67 or 67*a* is being displayed. Thus, a user will not be confused, for example, about the detail setting that had been displayed on the pop-up screen 67 or 67*a* before switching to the interruption mode. Moreover, the user is promoted to select the interruption mode after surely ending the pop-up display, so that the user will not be confused.

Here, for example, in a related art, it is possible to select the interruption mode while the pop-up screen is displayed. Here, who performed the setting while the pop-up screen is being displayed may be a user before the interruption (who is interrupted) or a user who interrupts. Thus, if the process was switched the interruption mode while the pop-up screen is being displayed, and the display of the pop-up screen is erased, iconized, or subjected to the like change, the user after the interruption will not be sure as to whether the setting set should be validated or invalidated while the pop-up screen is displayed. Thus, this confuses the user.

On the other hand, the present invention is, as described above, so arranged that the switching to the interruption mode is prevented while the pop-up screen 67 or 67*a* is being displayed. Thus, according to the present invention, such confusion associated with the related art will not occur.

Note that the arrangement in which the operation panel 50 is provided with the display control section 69, whereas the digital photocopying apparatus 1 as an electronic apparatus is provided with the control section 7 as control means is explained above. However, the present invention is not limited to this arrangement. For example, the present invention may be so arranged that the control section 7 has a function as the control section of the electronic apparatus, and a function as display control means and warning means of the operation panel as the user interfacing display apparatus. In this arrangement, the operation panel 50 and the control section 7 correspond to the user interfacing display apparatus provided in the digital photocopying apparatus 1 as an electronic apparatus.

Moreover, the interruption keys 60 and 70 may be so arranged as to change their display states according to whether there is a job as well as whether the pop-up screen 67 or 67*a* is displayed or not. According to this arrangement, it is possible to provide a more user friendly interface.

Moreover, in the above embodiment, explained is an arrangement in which the operation panel 50 or 50*a* as the user interfacing display apparatus is provided in the digital photocopying apparatus 1 as the image forming apparatus as an electronic apparatus. However, the present invention is not limited to this arrangement, and may be so arranged that the user interfacing display apparatus is provided in other kinds of electronic apparatus.

The present invention, not limited to embodiment and modifications, may be varied in may ways within the scope of the invention of the following claims, and all such embodiments attained by combining the embodiment and the modifications with disclosed technical means would be included within the scope of the present invention.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A user interfacing display apparatus for use in an electronic apparatus including (i) detail setting key for detecting what a user selects, and for performing detail setting of a job as to what a user selects, and (ii) control means, capable of performing a plurality of jobs respectively in accordance with desired detail settings, for suspending a job that is being processed or a job that is standing by and performing another job, in accordance with an interruption instruction, the user interfacing display apparatus comprising:

an interruption key for detecting the interruption instruction, and transmitting the interruption instruction to the control means, the interruption key being capable of changing a display state thereof;

a display section for displaying the desired detail settings; and display control means for (iii) popping up, when the detail setting key that is associated with one of the detail settings of one of the plurality of jobs is selected, a detail item of that one of the detail settings on the display section, and (iv) changing the display state of the interruption key, as a result of said selecting of said detail setting key, while keeping the interruption key displayed on the display section.

2. The user interfacing display apparatus as set forth in claim 1, wherein:

on performing the popping-up on the display section, the display control means transmits to the control means an instruction to invalidate the interruption instruction detected via the interruption key.

3. The user interfacing display apparatus as set forth in claim 2, wherein:

on ending the popping-up after the detail setting is completed, the display control means transmits to the control means an instruction to validate the interruption instruction detected via the interruption key.

4. The user interfacing display apparatus as set forth in claim 1, wherein:

the interruption key is a soft key that is displayed on the display section.

5. The user interfacing display apparatus as set forth in claim 4, wherein:

on performing the popping-up on the display section, the display control means hides part of the interruption key by performing the popping-up.

6. The user interfacing display apparatus as set forth in claim 1, wherein:

the interruption key is a hard key provided in the display section.

7. The user interfacing display apparatus as set forth in claim 6, wherein:

on performing the popping-up on the display section, the display control means switches over a lamp indicating whether the interruption key is available or unavailable.

8. The user interfacing display apparatus as set forth in claim 1, wherein:

on performing the popping-up on the display section, the display control means changes the display state of the interruption key to an unavailability display state informing that interruption is unavailable.

9. The user interfacing display apparatus as set forth in claim 8:

the changing of the display state of the interruption key to the unavailability display state is performed by lighting a color thickness of the interruption key from a predetermined color thickness in which the interruption key has been displayed.

10. The user interfacing display apparatus as set forth in claim 8, wherein:

the changing of the display state of the interruption key to the unavailability display state is performed by using a dotted line.

11. The user interfacing display apparatus as set forth in claim 1, wherein:

on ending the popping-up after the detail setting is completed, the display control means changes back the display state of the interruption key to a display state displayed before the popping-up is performed.

12. The user interfacing display apparatus as set forth in claim 1, further comprising:

warning means for warning the user, so that the display control means warns the user by using the warning means when detecting that the interruption key is selected while the popping-up is being performed on the display section.

13. The user interfacing display apparatus as set forth in claim 12, wherein:

the warning is performed by using a warning message.

14. The user interfacing display apparatus as set forth in claim 12, wherein:

the warning is performed by using a warning sound.

15. A user interfacing display apparatus for use in an electronic apparatus including (i) detail setting key for detecting what a user selects, and for performing detail setting of a job as to what a user selects, and (ii) a control section, capable of performing a plurality of jobs respectively in accordance with desired detail settings, for suspending a job that is being processed or a job that is standing by and performing another job, in accordance with an interruption instruction, the user interfacing display apparatus comprising:

an interruption key for detecting the interruption instruction, and transmitting the interruption instruction to the control section, the interruption key being capable of changing a display state thereof;

a display section for displaying the desired detail settings; and a display control section for (iii) popping up, when the detail setting key that is associated with one of the detail settings of one of the plurality of jobs is selected, a detail item of that one of the detail settings on the display section, and (iv) changing the display state of the interruption key, as a result of said selecting of said detail setting key, while keeping the interruption key displayed on the display section.

16. An image forming apparatus, which is an electronic apparatus, comprising (i) detail setting key for detecting what a user selects, and for performing detail setting of a job as to what a user selects, and (ii) control means, capable of performing a plurality of jobs respectively in accordance with desired detail settings, for suspending a job that is being processed or a job that is standing by and performing another job, in accordance with an interruption instruction, the image forming apparatus comprising:

a user interfacing display apparatus including:

an interruption key for detecting the interruption instruction, and transmitting the interruption instruction to the control means, the interruption key being capable of changing a display state thereof;

a display section for displaying the desired detail settings; and display control means for (iii) popping up, when the detail setting key that is associated with one of the detail settings of one of the plurality of jobs is selected, a detail item of that one of the detail settings on the display section, and (iv) changing the display state of the interruption key as a result of said selecting of said detail setting key, while keeping the interruption key displayed on the display section.

17. The image forming apparatus as set forth in claim 16 being a digital photocopying machine.

* * * * *